United States Patent [19]

Jysky

[11] 4,316,514

[45] Feb. 23, 1982

[54] METHOD OF BINDING DUST CREATED WHEN DRILLING ROCK WITH A DRILLING ROD

[75] Inventor: Göran H. Jysky, Nyköping, Sweden

[73] Assignee: Atlas Copco AB, Stockholm, Sweden

[21] Appl. No.: 178,414

[22] Filed: Aug. 15, 1980

[30] Foreign Application Priority Data

Aug. 22, 1979 [SE] Sweden .............................. 7907026

[51] Int. Cl.³ ........................ E21C 7/02; B01D 45/12; B01D 46/48

[52] U.S. Cl. ........................................ 175/66; 55/1; 55/385 D; 55/431; 55/432; 55/466; 55/468

[58] Field of Search ................ 55/1, 235, 385 D, 431, 55/432, 466, 468; 175/66, 88, 206; 366/195

[56] References Cited

U.S. PATENT DOCUMENTS

| | | | |
|---|---|---|---|
| 1,161,263 | 11/1915 | Spencer | 55/235 |
| 1,557,123 | 10/1925 | Vreeland | 55/1 |
| 1,781,352 | 11/1930 | Tolman, Jr. et al. | 55/468 |
| 2,304,744 | 12/1942 | Snyder | 366/195 |
| 2,308,365 | 1/1943 | Hornbrook | 55/432 |
| 2,857,854 | 10/1958 | Yellott et al. | 55/431 |
| 2,890,081 | 6/1959 | Terrett | 55/432 |

FOREIGN PATENT DOCUMENTS

| | | | |
|---|---|---|---|
| 914722 | 5/1954 | Fed. Rep. of Germany | 175/206 |
| 1010474 | 6/1957 | Fed. Rep. of Germany . | |
| 393156 | 5/1977 | Sweden . | |

*Primary Examiner*—David L. Lacey

*Attorney, Agent, or Firm*—Sughrue, Mion, Zinn, Macpeak & Seas

[57] ABSTRACT

A method for binding dust generated when rock drilling, by mixing said dust with a liquid. The apparatus to perform the method includes a mixing chamber (6) connected to a dust-separating means (1, 3); means for passing gravitationally to the mixing chamber (6) batches of dust collected in the separating means; and means (12) for supplying a liquid binder to the mixing chamber in an amount corresponding to the size of the batch of dust in question. Arranged in the mixing chamber (6) are means (7, 8) for mixing the dust and liquid by agitation while the next batch of dust is being collected in the separating means (1). The resultant mixture is discharged prior to the next batch of dust being supplied to the mixing chamber.

6 Claims, 1 Drawing Figure

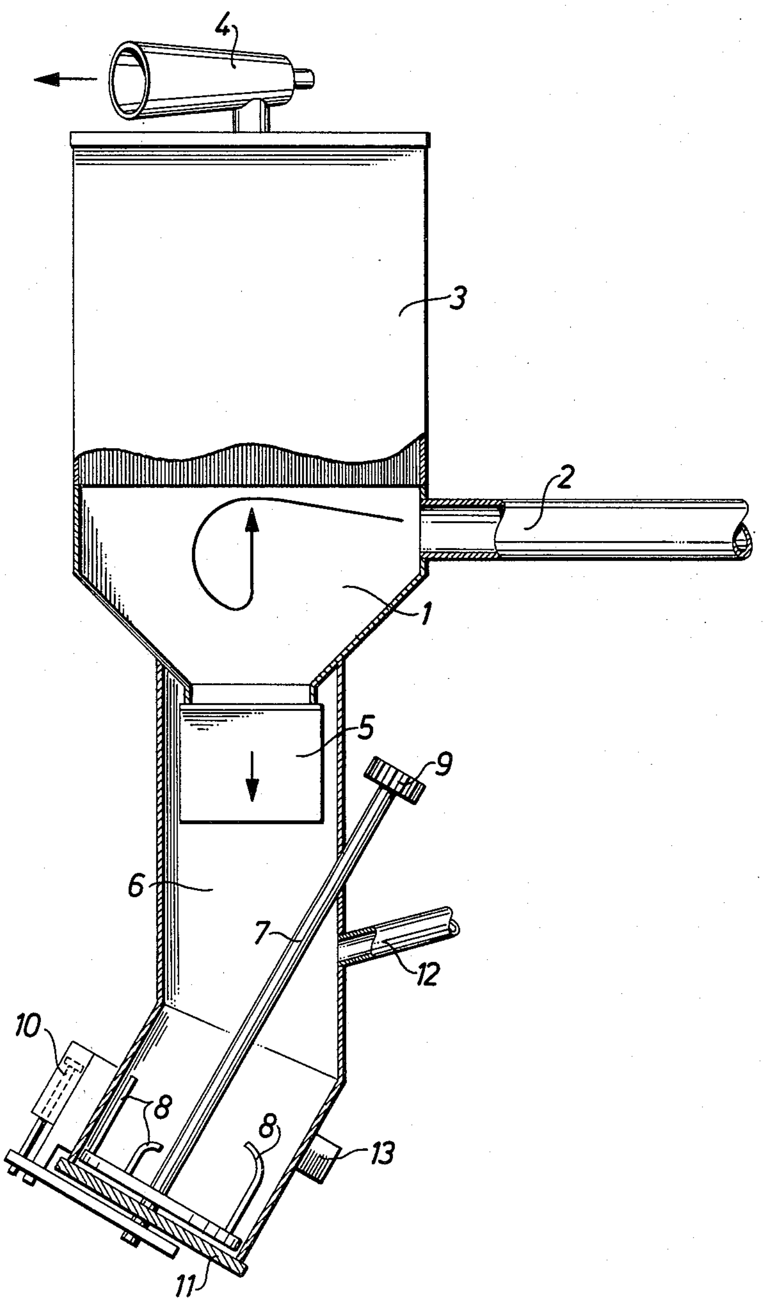
4
3
2
1
5
9
6
7
12
10
8
8
13
11

METHOD OF BINDING DUST CREATED WHEN DRILLING ROCK WITH A DRILLING ROD

The present invention relates to a method of binding dust created when drilling rock, in which the dust is mixed with a liquid binder. The invention also relates to apparatus for carrying out the method.

When drilling rock, large quantities of dust which is harmful, are created. In present day techniques the dust is collected in a hood placed around the drill hole. The hood communicates with a dust-separating device, normally comprising a cyclone combined with a filter unit, through a communication line. Dust separated in said device is at present collected in plastic bags. The use of plastic bags or sacks, however, is encumbered with a number of disadvantages, both with respect to the necessary handling of said bags and to the cost thereof. Further, if a bag should break the dust contained therein swirls up, creating a still greater health risk.

It has previously been proposed to bind dust with the aid of a liquid consisting of water and a suitable binder, to agglomerate the dust into a form in which it is no longer harmful to the health. The dust should be bound immediately it is created when drilling, since the freshly cut surfaces of the dust particles are then physically active, which provides a good binding effect. It is important, however, that the dust can be bound in a manner which does not necessiate the interruption of a drilling operation.

Consequently, it has previously been considered sufficient to bind dust created by drilling successively, at the rate in which it is generated, to which end different apparatus have been proposed. One such apparatus is described in the Swedish Patent specification No. 7404759-8. One of the disadvantages with such apparatus, however, is that the amount of liquid binder supplied must be continuously adapted to the amount of dust created. This is very difficult to achieve, and often impossible, since the amount of dust created varies greatly, for example, in dependence upon the hardness of the rock and the wear on the drill crown or bit.

The main object of the present invention is to provide a method and apparatus which permit the liquid binder to be dispensed to the dust in given quantities, in a precise and simple fashion, while being mixed carefully with said dust without interrupting the drilling operation, thereby eliminating the aforementioned disadvantages.

This object is achieved in accordance with the present invention by mixing the dust batchwise with a liquid binder, said batches being of a pre-determined magnitude, for example a magnitude corresponding to the amount of dust obtained per length of drilling rod section. Treatment of one batch thus takes place while a subsequent batch of dust is being collected. The ready-mixed batch is discharged from the apparatus before the following batch is complete.

A method according to the invention is characterized in that the dust is collected in the bottom of a dust-separating means and is supplied in batches of given magnitude to a mixing chamber to which a liquid binder is also fed in an amount corresponding to the magnitude of the batch in question; that the dust and liquid are mixed by stirring while a further batch of dust is collected in the separating means; and that the resultant mixture is discharged before the next batch of dust is fed to the mixing chamber.

Preferably, the liquid binder is fed to the mixing chamber prior to a batch of dust being introduced thereinto, and that said dust batch is passed to the mixing chamber gravitationally via a bottom valve arranged in the separating means. Preferably, the bottom valve is pressure controlled, and is operated in response to the pressure difference between the collecting means and the mixing chamber.

In a preferred embodiment, the separating means operates with an internal underpressure generated by an ejector, whereat said valve is arranged to be opened when the ejector is disconnected, e.g. when lengthening the drilling rod, and is closed when the ejector is reconnected. The liquid binder is thus metered in amounts relating to the length of the drilling rod and the diameter of the crown or bit of the drill. Preferably, the liquid binder is supplied to the mixing chamber under a pressure of such magnitude and in such a manner to provide a flushing or rinsing effect.

Other characterizing features of the invention are set forth in the claims.

An exemplary embodiment of the invention will now be described with reference to the accompanying drawing.

In the drawing, the reference numeral 1 identifies a cyclone to which air containing dust is passed via a line 2 extending from a drill hole. The cyclone 1 is combined with a filter element 3 in a conventional manner. The reference numeral 4 identifies an ejector arranged to create an underpressure in the cyclone 1 and the filter unit 3, and the outlet of which ejector communicates with the surrounding atmosphere. Arranged in the bottom of the cyclone 1 is a pressure-controlled valve 5 via which the cyclone can be placed in communication with a mixing chamber 6. In the illustrated embodiment, the valve 5 comprises a so-called "rubber valve" which in its simplest form comprises a readily compressible rubber hose. When a pressure below ambient pressure prevails in the cyclone 1, as a result of the action of the ejector 4, the rubber hose will collapse as a result of the pressure prevailing in the mixing chamber 6, thereby closing the valve. When the ejector 4 is disconnected, the hose is opened as a result of the equalization of pressure between the cyclone 1 and the chamber 6.

The mixing chamber 6 is provided with agitator means which includes an agitator element 8 and which can be rotated via a shaft 7. The chamber 6 is angled, which means that the shaft 7 can be driven via a gear drive located on the outside of the chamber, thereby obviating the need for bevel-gear drives or the like. The lower end of the chamber 6 is closed by means of a closing element 11 operated by a double-acting air cylinder 10. The reference numeral 12 identifies an inlet for binding liquid, while the reference numeral 13 identifies a vibrator.

The illustrated apparatus has the following mode of operation. When carrying out a drilling operation, the ejector 4 is made operative, and air laden with dust is drawn by suction into the cyclone 1, the bottom valve 5 of which is closed as a result of the under-pressure prevailing in the cyclone. Dust separated in the cyclone 1 and the filter unit 3 falls down onto the bottom of the cyclone, where it is collected. When a distance corresponding, for example, to the length of one drilling rod has been drilled, and a further drilling rod is to be assembled, so to lengthen the drill, the ejector 4 is cut-off. The pressure in the cyclone 1 will then rise and the valve 5 is opened, and the batch of dust collected in the cyclone 1 falls down into the mixing chamber 6. In conjunction herewith, the filter incorporated in the unit 3 is suitably vibrated, so that dust held in the filter also falls down into the mixing chamber 6. Prior to this, a given amount of a liquid binder, comprising water and some percent by volume of a suitable organic binder of known kind, has been introduced into the mixing chamber. The amount is determined in dependence upon the size of the batch of dust passed to the mixing chamber. In the described embodiment, the amount of binding liquid added has been determined in dependence upon the length of a drilling-rod section and the diameter of the drilling crown or bit.

The dust is mixed with the liquid in the mixing chamber 6, whose bottom flap 11 is closed, by means of the rotary agitator means provided with said agitator element 8. This mixing operation can be continued while the next drill length is drilled, and fresh dust is collected on the bottom of the cyclone 1, the bottom valve 5 of said cyclone being re-closed as a result of the action of the re-connected ejector 4. Thus, since mixing of the dust with the binding liquid can be continued for a relatively long time, several minutes, there is obtained a highly homogenous mixture in which substantially all dust is bound. Further, only a minimal amount of liquid is required, in the order of magnitude of 15 cl per liter of dust. The ready-mixed mass, which has a doughy consistency, is discharged by opening the flap 11 by means of the air cylinder 10, which can be effected immediately prior to re-connecting the ejector 4 in conjunction with changing a drilling rod and/or vibrating the filter. To facilitate discharge of the ready-mixed mass there can be used, for example, a vibrator 13 which is connected to the wall of the mixing chamber 6.

As soon as the ready-mixed mass has been discharged from the apparatus, the bottom flap 11 is re-closed and a further amount of liquid binder is supplied via the inlet 12, said amount being adjusted to the amount of dust collected on the bottom of the cyclone 1 and entering the mixing chamber. The binding liquid is suitably fed at a pressure of about 6 atmospheres, and with such a spread to clean out the mixing chamber 6 as said liquid is injected thereinto. The mixing arrangement may be driven, for example, by means of a hydraulic motor which, as beforementioned, can be effected without the use of bevel-gear drives or the like, owing to the fact that the mixing chamber 6 is angled, which enables the drive 9 arranged on the shaft 7 to be reached from outside the apparatus.

As will be understood from the description, binding of the dust in accordance with the invention does not affect the drilling operation, since both the mixing of a batch of dust and the supplying of the binding liquid for the subsequent batch are carried out during a drilling operation. Transfer of dust collected in the cyclone 1 to the mixing chamber 6 is effected when it is necessary to interrupt the drilling operation, for the purpose of changing a drilling rod or the like measure. No other form of interruption is necessary when binding the dust in accordance with the invention. Further, as beforementioned, the binding liquid can be metered to the apparatus very precisely, since the amount of dust generated per length of drilling rod can be readily calculated with knowledge of the length of the drilling rod and the diameter of the drill bit. Thus, it is not necessary to vary the amount of liquid metered to the apparatus during a drilling operation in dependence of whether hard or loose rock is being drilled and in dependence on the condition of the drill bit. Further, it is essential that mixing of the dust and binding liquid can be continued for a length of time such as to ensure positive binding of substantially all the dust.

The invention is not restricted to the illustrated and described embodiment, but can be modified in many ways while keeping to the basic principle, namely that treatment of the dust should be effected batchwise, whereat one batch is treated while a further batch is being collected. Thus, the rubber valve 5 can be replaced, for example, with a valve of the desired construction, whereat if said valve is not pressure-controlled a further air cylinder or the like must be used for operating said valve. The mixing chamber may be arranged at one side of the separating means, whereat the dust is transported by means of suitable devices, e.g. conveyor screws. In addition to being applied to cyclones and filter units working with an internal underpressure, the invention can also be applied to such cyclones and filter units as those operating with an internal overpressure, i.e. in which the ejector is positioned upstream of the separating means. As will be understood, a fan or the like may also be used in addition to the ejector. The cyclone may also be replaced with a simple receiver. The agitating means may be driven by means of any desired arrangement, e.g. by means of a hydraulic motor, or may be given a reversing movement by means of a hydraulic cylinder arrangement. The different means can also be caused to act upon each other in a manner such as to provide a substantially automatic arrangement. The carefully mixed mass discharged from the apparatus when opening the bottom flap 11 hardens rapidly when coming into contact with the atmosphere, to form a hard cake which can be left at the drilling site without risk to the health.

What is claimed is:

1. A method of binding dust created when drilling rock with a drilling rod having a bit, by mixing said dust with a liquid, comprising the steps of collecting the dust on the bottom of a dust-separating means, feeding the dust in batches of given size to a mixing chamber, supplying to said chamber a liquid binder in an amount corresponding to the size of said batch of dust; mixing the dust and liquid by stirring while a further batch of dust is collected in the separating means; and discharging the resultant mixture from the mixing chamber before the next batch of dust is fed to the mixing chamber.

2. A method according to claim 1, wherein the liquid binder is supplied to the mixing chamber first, and the dust batch is then fed gravitationally to the mixing chamber, via a bottom valve arranged in the separating means.

3. A method according to claim 2, wherein the bottom valve is pressure-controlled and is operated in response to the pressure difference between the dust separating means and the mixing chamber.

4. A method according to claim 3, wherein said step of collecting by using said dust separating means operates with an internal under-pressure generated by an ejector, wherein said bottom valve is opened when the ejector is disconnected, and is closed when the ejector is re-connected.

5. A method according to claim 4, wherein the liquid binder is metered to the mixing chamber in relation to the length of the drilling rod and the diameter of the drill bit.

6. A method according to claim 1, wherein the liquid binder is supplied to the mixing chamber at a pressure of such magnitude and in such a manner as to provide a cleaning effect of said mixing chamber.

* * * * *